(12) United States Patent
Ikeda et al.

(10) Patent No.: US 11,588,384 B2
(45) Date of Patent: Feb. 21, 2023

(54) DEVICE AND METHOD FOR MANUFACTURING MAGNET EMBEDDED CORE

(71) Applicant: Kuroda Precision Industries Ltd., Kawasaki (JP)

(72) Inventors: Masanobu Ikeda, Chikuma (JP); Tomoaki Murayama, Ikeda-machi (JP)

(73) Assignee: KURODA PRECISION INDUSTRIES LTD., Kawasaki (JP)

( * ) Notice: Subject to any disclaimer, the term of this patent is extended or adjusted under 35 U.S.C. 154(b) by 466 days.

(21) Appl. No.: 16/493,374

(22) PCT Filed: Nov. 5, 2018

(86) PCT No.: PCT/JP2018/041053
§ 371 (c)(1),
(2) Date: Sep. 12, 2019

(87) PCT Pub. No.: WO2020/095349
PCT Pub. Date: May 14, 2020

(65) Prior Publication Data
US 2021/0408880 A1    Dec. 30, 2021

(51) Int. Cl.
*H02K 15/10*    (2006.01)
*B29C 45/02*    (2006.01)
(Continued)

(52) U.S. Cl.
CPC ........... *H02K 15/10* (2013.01); *B29C 45/021* (2013.01); *B29C 45/03* (2013.01);
(Continued)

(58) Field of Classification Search
None
See application file for complete search history.

(56) References Cited

U.S. PATENT DOCUMENTS

2018/0117806 A1\* 5/2018 Mabu ................ B29C 45/26
2020/0099278 A1\* 3/2020 Fukuyama ........... B29C 45/03

FOREIGN PATENT DOCUMENTS

JP    2013240202    11/2013
JP    2014091220    5/2014
(Continued)

OTHER PUBLICATIONS

English Translation of JP 2015100157A (Year: 2015).\*
(Continued)

*Primary Examiner* — Timothy Kennedy
*Assistant Examiner* — Olukorede Esan
(74) *Attorney, Agent, or Firm* — Dority & Manning, P.A.

(57) ABSTRACT

In manufacturing a magnet embedded core, creation of flash, and problems associated with flash are prevented. A device for manufacturing the magnet embedded core comprises a base (32) comprising an upper surface at which a resin pot chamber (64) for storing molten resin opens, a separator plate (36) detachably placed on the upper surface of the base (32) to support a rotor core (2) thereon and having a gate (50) and a cull opening (52) communicating the magnet insertion hole (4) of the rotor core (2) with the resin pot chamber (64), and a plunger (62) movably provided in the resin pot chamber (64) to press the molten resin in the resin pot chamber (64) into the magnet insertion hole (4) via the gate (50) and the cull opening (52), wherein an annular recess (66) is formed on the upper surface of the base (32) so as to extend outward of the resin pot chamber (64) and communicate with the resin pot chamber (64).

3 Claims, 9 Drawing Sheets

(51) Int. Cl.
*B29C 45/03* (2006.01)
*B29C 45/14* (2006.01)
*H02K 15/02* (2006.01)
*B29L 31/00* (2006.01)

(52) U.S. Cl.
CPC ....... *B29C 45/14344* (2013.01); *H02K 15/02* (2013.01); *B29K 2995/0008* (2013.01); *B29L 2031/7498* (2013.01)

(56) References Cited

FOREIGN PATENT DOCUMENTS

| | | | | |
|---|---|---|---|---|
| JP | 2015100157 | | 5/2015 | |
| JP | 2015100157 A | * | 5/2015 | ............... H02K 1/27 |
| JP | 2019187165 | | 10/2019 | |
| WO | WO2017179086 | | 10/2017 | |
| WO | WO2017179087 | | 10/2017 | |
| WO | WO2017179231 | | 10/2017 | |
| WO | WO2017179398 | | 10/2017 | |
| WO | WO2017179547 | | 10/2017 | |

OTHER PUBLICATIONS

International Search Report for PCT/JP2018/041053 dated Nov. 27, 2018, 10 pages.
Office Action for Japanese Patent Application No. 2019-530518, dated Oct. 5, 2022, 12 pages.

* cited by examiner

DEVICE AND METHOD FOR MANUFACTURING MAGNET EMBEDDED CORE

CROSS REFERENCE TO RELATED APPLICATIONS

This application is the U.S. National Stage entry of International Application Number PCT/JP2018/041053 filed under the Patent Cooperation Treaty having a filing date of Nov. 5, 2018, which is incorporated herein by reference.

TECHNICAL FIELD

The present invention relates to a device and a method for manufacturing a magnet embedded core, and in particular to a device and a method for manufacturing the magnet embedded core for use in rotating electric machinery.

BACKGROUND ART

Various technologies have been developed to manufacture the magnet embedded core of rotating electric machinery by inserting a magnet into each of a plurality of magnet insertion holes defined axially in a rotor core, charging resin material in liquid form into the magnet insertion holes, and curing the charged resin material to fix the magnets in the rotor core.

A known manufacturing device for such a magnet embedded core includes a base provided with resin pot chambers for storing molten resin therein, each having an opening at an upper surface of the base, a separator plate detachably placed on the upper surface of the base to support the rotor core and provided with communication passages communicating the resin pot chambers with the corresponding magnet insertion holes, and a plurality of plungers each movably received in the corresponding resin pot chamber to press the molten resin in the resin pot chamber into the corresponding magnet insertion hole via the corresponding communication passage.

Patent Document 1: WO2017/179547A

SUMMARY OF THE INVENTION

Task to be Accomplished by the Invention

According to the manufacturing device for the magnet embedded core mentioned above, in the step of pressing the molten resin in each resin pot chamber with the corresponding plunger into the corresponding magnet insertion hole, and the following pressure maintaining step, the molten resin may pass from the resin pot chamber into the gap between the upper surface of the base and the lower surface of the separator plate, and solidify therein to create thin flash. Flash deposited on the base may cause a surface flaw in the molded resin or leakage of resin. Also, flash tends to be readily broken up to get mixed with the molten resin that is charged into the magnet insertion holes. As a result, the resin may not be properly charged into the magnet insertion holes.

The present invention was made in view of such a problem of the prior art, and has a primary object to prevent creation of flash, and prevent problems associated with creation of flash.

Means to Accomplish the Task

A device for manufacturing the magnet embedded core according to one embodiment of the present invention is a device for manufacturing a magnet embedded core including a rotor core provided with a magnet insertion hole that constitutes a through hole opening out at both axial end surfaces of the rotor core, a magnet positioned in the magnet insertion hole, and resin with which the magnet insertion hole is filled, the manufacturing device comprising: a base comprising one surface at which a resin pot chamber for storing molten resin opens; a separator plate detachably placed on the one surface of the base, the rotor core being placed on the separator plate, the separator plate having a communication passage communicating the magnet insertion hole with the resin pot chamber; and a plunger movably provided in the resin pot chamber to press the molten resin in the resin pot chamber into the magnet insertion hole via the communication passage; wherein an annular recess is provided at a boundary between the base and the separator plate so as to extend outward of the resin pot chamber and communicate with the resin pot chamber.

According to this configuration, creation of flash is prevented so that any failure due to flash can be avoided.

In the above device for manufacturing the magnet embedded core, preferably, a thickness of the recess in a moving direction of the plunger is from 0.1 mm to 0.3 mm.

According to this configuration, wastage of the resin can be minimized.

In the above device for manufacturing the magnet embedded core, preferably, the base includes a base main body having a pot retaining hole opening out at an outer surface of the base main body on a side of the one surface of the base, and a pot member fitted into the pot retaining hole. The resin pot chamber is defined by the pot member, and the pot member has an end surface on a side of the one surface of the base, the end surface being offset from the outer surface of the base main body away from the separator plate. The recess is defined by the end surface of the pot member, an inner circumferential surface of the pot retaining hole and a surface of the separator plate on a side of the base.

According to this configuration, the recess can be formed accurately simply by selecting the axial length of the pot member.

In the above device for manufacturing the magnet embedded core, preferably, the recess is defined by a cutout formed into a surface of the separator plate on a side of the base, and the base.

According to this configuration, the recess can be formed in an accurate manner by processing the separator plate.

Another aspect of the present invention provides a method for manufacturing the magnet embedded core including a rotor core provided with a magnet insertion hole that constitutes a through hole opening out at both end surfaces of the rotor core, a magnet positioned in the magnet insertion hole, and resin with which the magnet insertion hole is filled, by using the manufacturing device according to the aforementioned embodiment, the method comprising a pressing feed step of pressing the molten resin in the resin pot chamber into the magnet insertion hole with the plunger, wherein in the pressing feed step, a part of the molten resin that has advanced into the recess and ceased to flow in the recess is caused to solidify faster than a part of the molten resin flowing in a remaining part.

According to this method, creation of flash is prevented so that any failure due to flash can be avoided.

Effects of the Invention

The device and the method for manufacturing the magnet embedded core according to the present invention prevent creation of flash so that any failure due to flash can be avoided.

BRIEF DESCRIPTION OF THE DRAWING(S)

Figure 8:
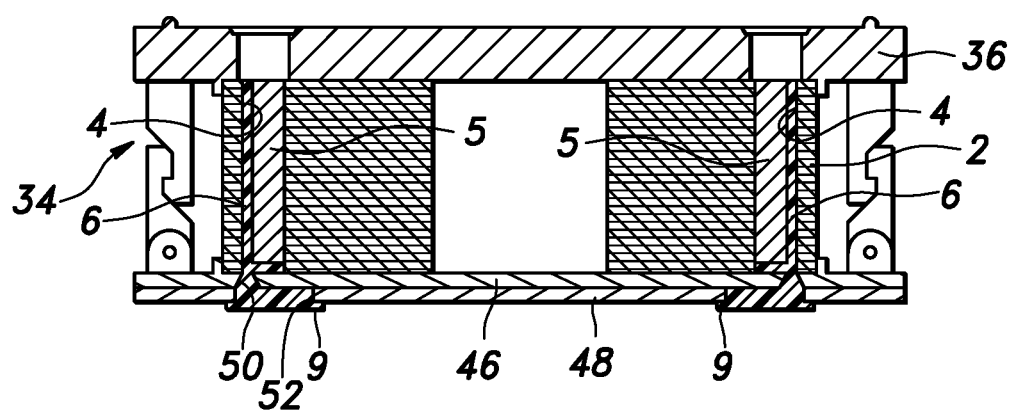
Figure 9:
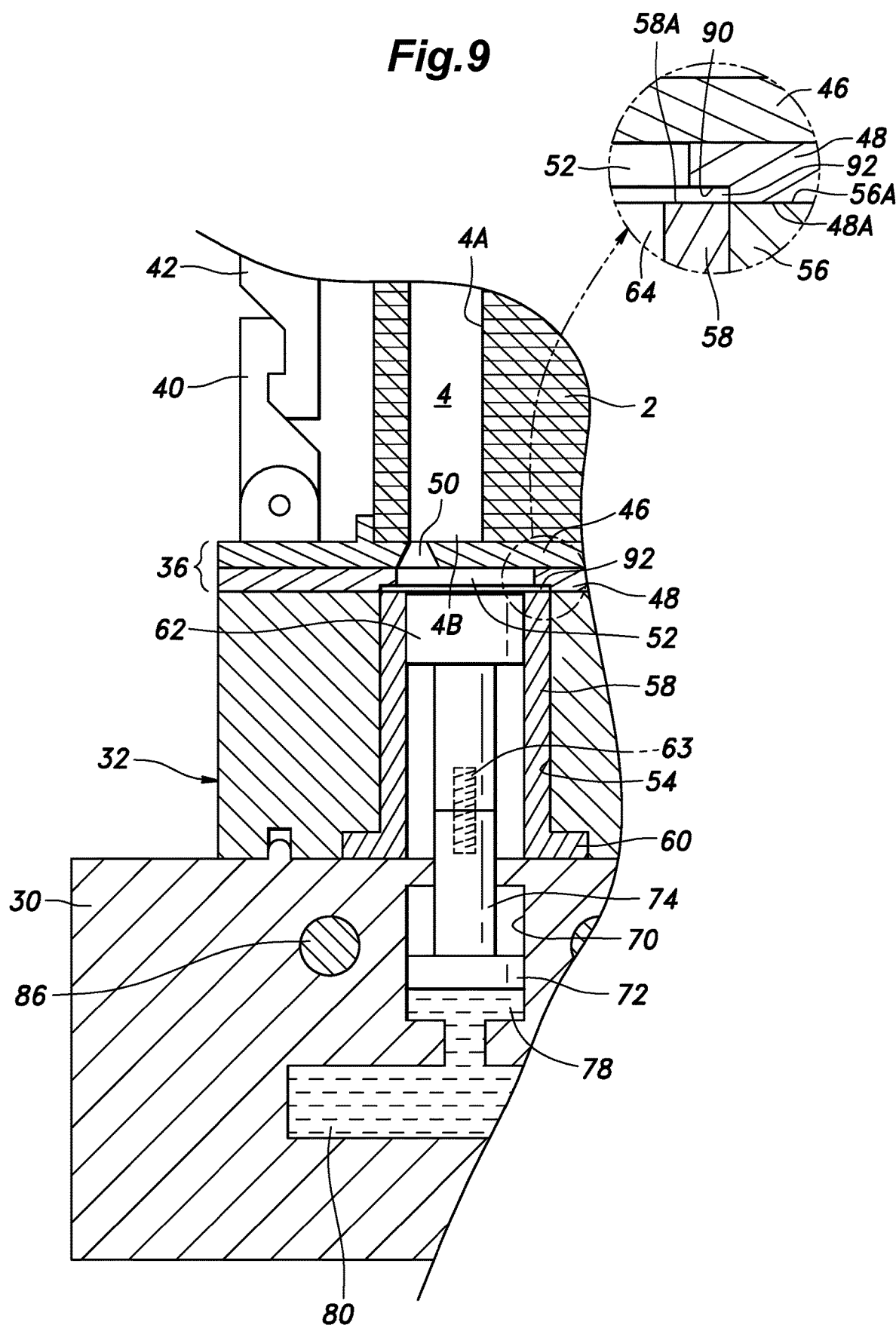

FIG. 8 is a vertical sectional view of the magnet embedded core manufactured by the manufacturing device for the magnet embedded core according to the embodiment of the present invention, and removed from a molding device; and FIG. 9 is an enlarged vertical sectional view of the main part of the manufacturing device for the magnet embedded core according to another embodiment of the present invention.

EMBODIMENT(S) FOR CARRYING OUT THE INVENTION

Preferred embodiments of the present invention are described in the following with reference to the appended drawings.

First of all, an example of the magnet embedded core manufactured by the manufacturing device and the manufacturing method according to the embodiment of the present invention is described in the following with reference to FIGS. 1 and 2.

The magnet embedded core 1 is a component part of rotating machinery such as an electric motor, and includes a rotor core 2. The rotor core 2 is a laminated iron core formed by laminating a plurality of electromagnetic steel sheets and joining the electromagnetic steel sheets together by using a per se known joining method (such as crimping, laser welding, bonding, etc.). The rotor core 2 is substantially annular in shape in plan view, and is centrally provided with a shaft hole 3.

The rotor core 2 is formed with a plurality of magnet insertion holes 4 each defining a substantially rectangular space. Each magnet insertion hole 4 extends through the rotor core 2 in an axial direction, and opens out at both of the end surfaces of the rotor core 2. In the illustrated embodiment, although the magnet insertion holes 4 are formed in four locations that are circumferentially arranged at a regular interval, the magnet insertion holes 4 are not limited to this embodiment, but can be arranged in any other different way with regard to shape, number and arrangement.

A substantially rectangular parallelepiped shaped magnet 5 is received in each magnet insertion hole 4. Each magnet 5 may consist of, for example, a ferrite-based sintered magnet or a permanent magnet (with or without magnetization) such as a neodymium magnet. The dimensions of each magnet 5 are slightly smaller than the corresponding dimensions of the magnet insertion hole 4. As a result, a gap is created between the rotor core 2 and each magnet 5, and is filled by resin 6 which fixes the magnet 5 to the rotor core 2. The resin 6 may consist of thermosetting resin such as epoxy resin or the like.

Figure 1:
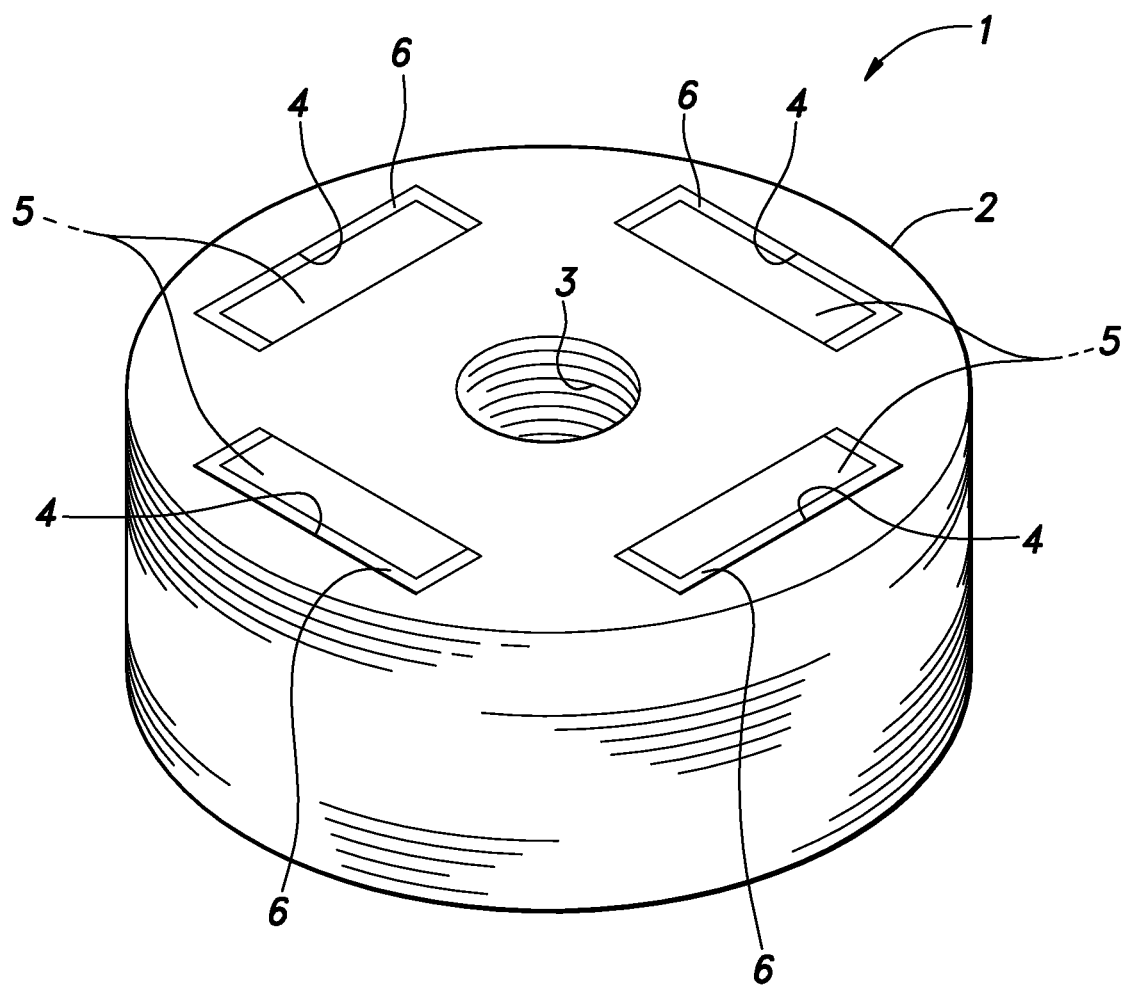
FIG. 1 is a perspective view of an example of a magnet embedded core manufactured by a manufacturing method and a manufacturing device according to an embodiment of the present invention.
Figure 2:
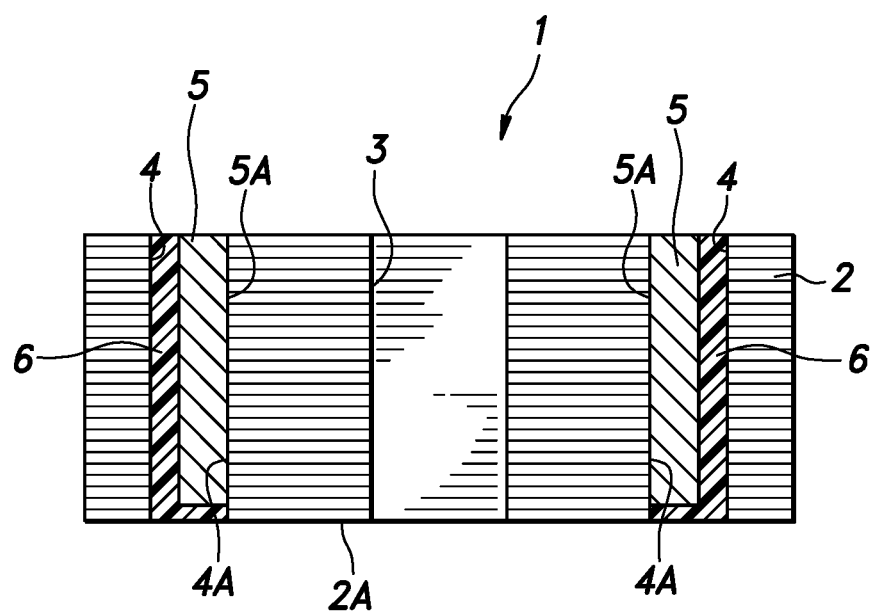
FIG. 2 is a vertical sectional view of the magnet embedded core.

As shown in FIG. 1, the magnet 5 in each magnet insertion hole 4 is inwardly offset (or offset toward the center of the rotor core 2) so that the outer surface 5A of the magnet 5 facing toward the center of the rotor core 2 makes a surface contact with (abuts against) the corresponding inner surface 4A of the corresponding magnet insertion hole 4. Thereby, the magnets 5 are uniformly arranged in regard to the radial positioning with respect to the rotor core 2, and, also, the magnet insertion holes 4 are arranged uniformly in regard to the circumferential positioning thereof with respect to the rotor core 2 so that the magnets 5 are prevented from becoming a cause for any rotational imbalance. The magnets 5 may also be offset in the opposite radial direction from that shown in FIG. 1 (or offset away from the center of the rotor core 2).

A manufacturing device 10 for the magnet embedded core 1 of the illustrated embodiment is described in the following with reference to FIGS. 3 to 7.

The manufacturing device 10 is provided with a press structure that includes a plurality of vertically extending tie bars 12, a plate-shaped fixed platen 16 fixed to upper parts of the tie bars 12, and a plate-shaped movable platen 14 vertically movably supported by the tie bars 12 under the fixed platen 16. The movable platen 14 can be driven vertically by a die clamping device not shown in the drawings which may be based on a per se known toggle-link mechanism or feed screw mechanism.

An upper member 18 is fixed to the lower surface of the fixed platen 16. Closure members 20 for the respective magnet insertion holes 4 are fixed to the upper member 18 by respective rods 19 projecting downward from the lower surface of the upper member 18, and a core pressing member 24 is suspended from the upper member 18 by springs 22. The closure members 20 are provided so as to close the respective magnet insertion holes 4, and are each formed into a substantially rectangular shape in plan view which is larger than the plan view shape of the corresponding magnet insertion hole 4. Through holes 26 which receive the respective closure members 20 in the vertical direction are formed in the core pressing member 24. The closure members 20 may be each formed in a substantially rectangular shape in plan view which is larger than the plan view shape of the corresponding magnet insertion hole 4. Alternatively, the closure member 20 may have a plan view shape which covers two or more of the adjoining magnet insertion holes 4 so as to simplify the structure of the manufacturing device 10.

A lower member 30 is fixed to the movable platen 14. A base 32 is mounted to the lower member 30. A separator plate 36 of a rotor core retainer 34 is placed on an upper surface of the base 32 (the upper surface 56A of a base main body 56 which will be described hereinafter) in a detachable and replaceable manner.

The rotor core retainer 34 includes the separator plate 36 which serves as a tray for placing a rotor core 2 thereon, and a plate-shaped upper plate 38 placed above the separator plate 36. The separator plate 36 and the upper plate 38 can be connected to each other by engaging movable engagement claws 40 provided on the separator plate 36 with fixed engagement claws 40 attached to the upper plate 38, and retain the rotor core 2 in the vertical direction therebetween in a detachable manner. The rotor core retainer 34 is transportable so as to be placed onto and removed from the base 32 while the rotor core 2 is interposed between the separator plate 36 and the upper plate 38.

The upper plate 38 is formed with insertion holes 44 that extend vertically through the upper plate 38 so as to allow the closure members 20 to move into the respective insertion holes 44 at positions aligning with the respective magnet insertion holes 4 of the rotor core 2. The insertion holes 44 may have same dimensions as the through holes 26 formed in the core pressing member 24. The insertion holes 44 and the closure members 20 can be accurately aligned with one another as projections 25 (see FIG. 3) formed on the outer peripheral edges of the through holes 26 fit into recesses 45 (see FIG. 3) formed on the outer peripheral edges of the insertion holes 44, respectively, during the upward stroke of the movable platen 14.

Figure 4:
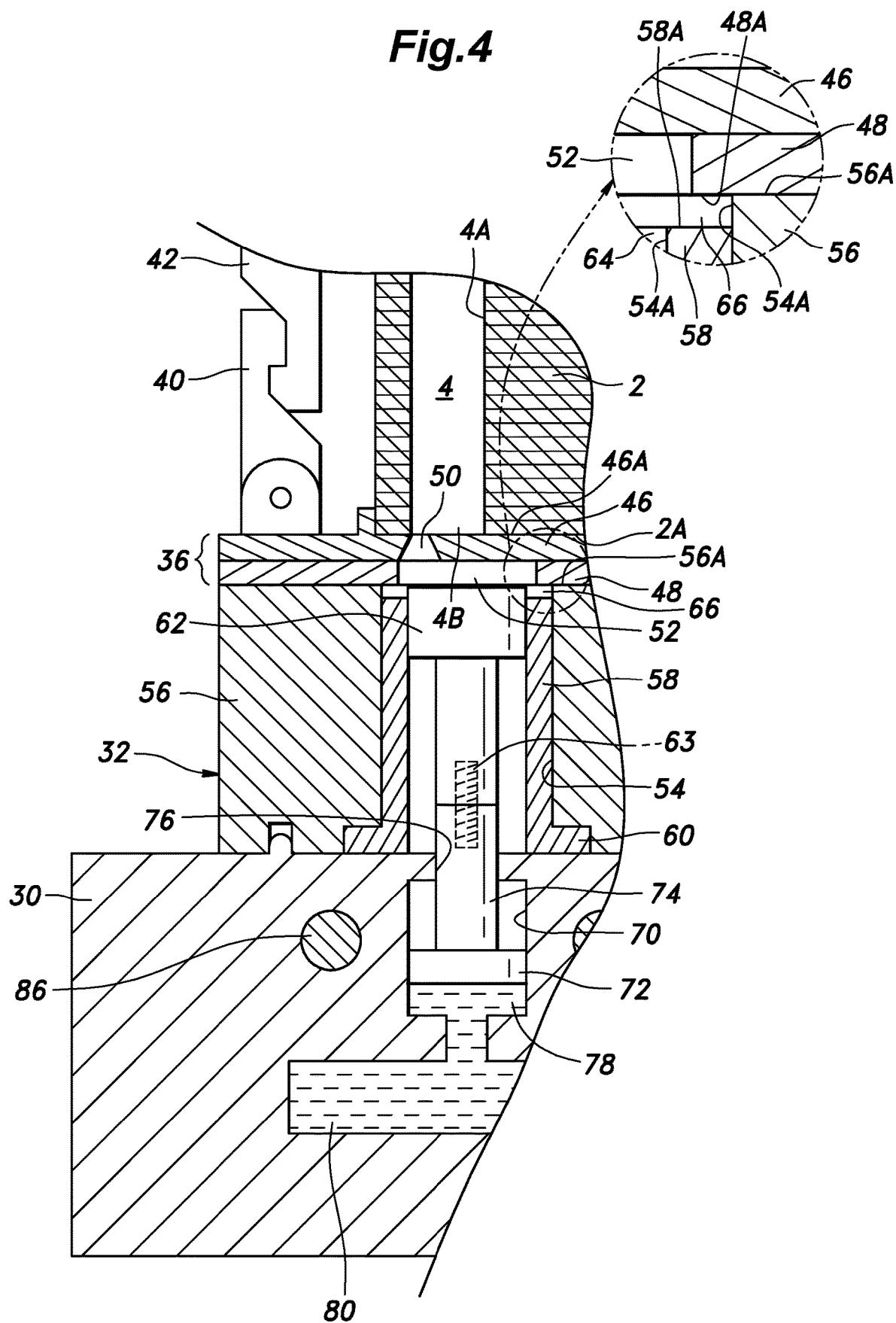
FIG. 4 is an enlarged vertical sectional view of the main part of the manufacturing device for the magnet embedded core according to the embodiment of the present invention.

As shown in FIG. 4, the separator plate 36 is formed by laying a gate plate 46 and a cull plate 48, each consisting of a planar plate, one on the other, and the gate plate 46 and a cull plate 48 may be joined dismantleably to each other by using threaded bolts (not shown in the drawings). The gate plate 46 has an upper surface 46A that abuts a lower end surface 2A of the rotor core 2 and a plurality of gates 50 that communicate with the lower openings 4B of the respective magnet insertion holes 4 individually. The cull plate 48 is located under the gate plate 46, and comprises a plurality of cull openings 52 having a circular shape of a cross section and communicating with the respective gates 50 and respective resin pot chambers 64 which will be described hereinafter. Thus, each of the gates 50 and the corresponding cull opening 52 form a communication passage communicating the corresponding magnet insertion hole 4 and the corresponding resin pot chamber 64 with each other.

The base 32 includes a base main body 56 having a flat upper surface (outer surface) 56A, and pot retaining holes 54 arranged so as to correspond to the respective magnet insertion holes 4 and each having a circular shape of a cross section and an open upper end, and cylindrical pot members 58 received in the respective pot retaining holes 54. Each pot member 58 is provided with a flange 60 at a lower end thereof, and the flange 60 is clamped between the base main body 56 and the lower member 30 so that the pot member 58 is fixed to them. Each pot member 58 has a free end at the upper end thereof so as to be free from stress due to thermal expansion.

Each pot member 58 receives a plunger 62 in a vertically (in the axial direction of the pot member 58) movable manner. The pot member 58 defines a resin pot chamber 64 above the plunger 62 (see FIG. 6). The resin pot chamber 64 is a space having a circular cross section coaxial with the cull opening 52, and opens at the upper surface 56A of the base 32. The inner diameter of the resin pot chamber 64 is smaller than the inner diameter of the cull opening 52, and smaller than the inner diameter of the pot retaining hole 54 by the thickness of the pot member 58.

The upper end surface 58A of the pot member 58 is at a position lower than the upper surface 56A of the base main body 56, or in other words, on the side away from the separator plate 36 as compared to the upper surface 56A of the base main body 56. As a result, an annular recess 66 is defined by the upper end surface 58A of the pot member 58, an inner circumferential surface 54A of the pot retaining hole 54, and the lower surface 48A of the cull plate 48 (the surface of the separator plate 36 on the side of the base 32). The recess 66 extends radially outward of the resin pot chamber 64 at the boundary between the base 32 and the separator plate 36, and may be considered as forming a groove shape facing radially inward and surrounding the resin pot chamber 64, and directly communicates with the resin pot chamber 64. The thickness (width) of the recess 66 as measured in the moving direction of the plunger 62 may be 0.1 mm to 0.3 mm to achieve an effective sealing effect which will be discussed hereinafter although the thickness is shown with some exaggeration in the drawings. In this embodiment, by appropriately selecting the axial length of the pot member 58, the thickness of the recess 66 can be accurately realized.

Cylinder bores 70 are formed in the lower member 30 so as to correspond to the respective plungers 62. Each cylinder bore 70 receives a piston 72 in a vertically movable manner (in the axial direction). A piston rod 74 extends upward from each piston 72 and projects into the corresponding pot member 58 via a through hole 76 formed in the lower member 30. The piston rod 74 is integrally connected to the plunger 62 with a screw 63 (see FIG. 4).

The lower member 30 defines a cylinder chamber 78 under each piston 72 as a pressing chamber. The cylinder chambers 78 are provided individually for the respective plungers 62, or for the respective resin pot chambers 64 so that hydraulic oil may be supplied to the cylinder chambers 78 from a hydraulic pressure generating device 84 via a manifold passage 80 formed in the lower member 30 and external piping 82. Each piston 72 moves upward as the hydraulic oil is supplied from the hydraulic pressure generating device 84 to the corresponding cylinder chamber 78, and pushes (presses) the corresponding plunger 62 upward via the corresponding piston rod 74.

An electric heater 86 for heating the molten resin 8 in the resin pot chambers 64 is embedded in the lower member 30.

The various steps of the manufacturing method for the magnet embedded core 1 of the illustrated embodiment using the manufacturing device 10 are described in the following with reference to FIGS. 3 to 8.

Figure 3:
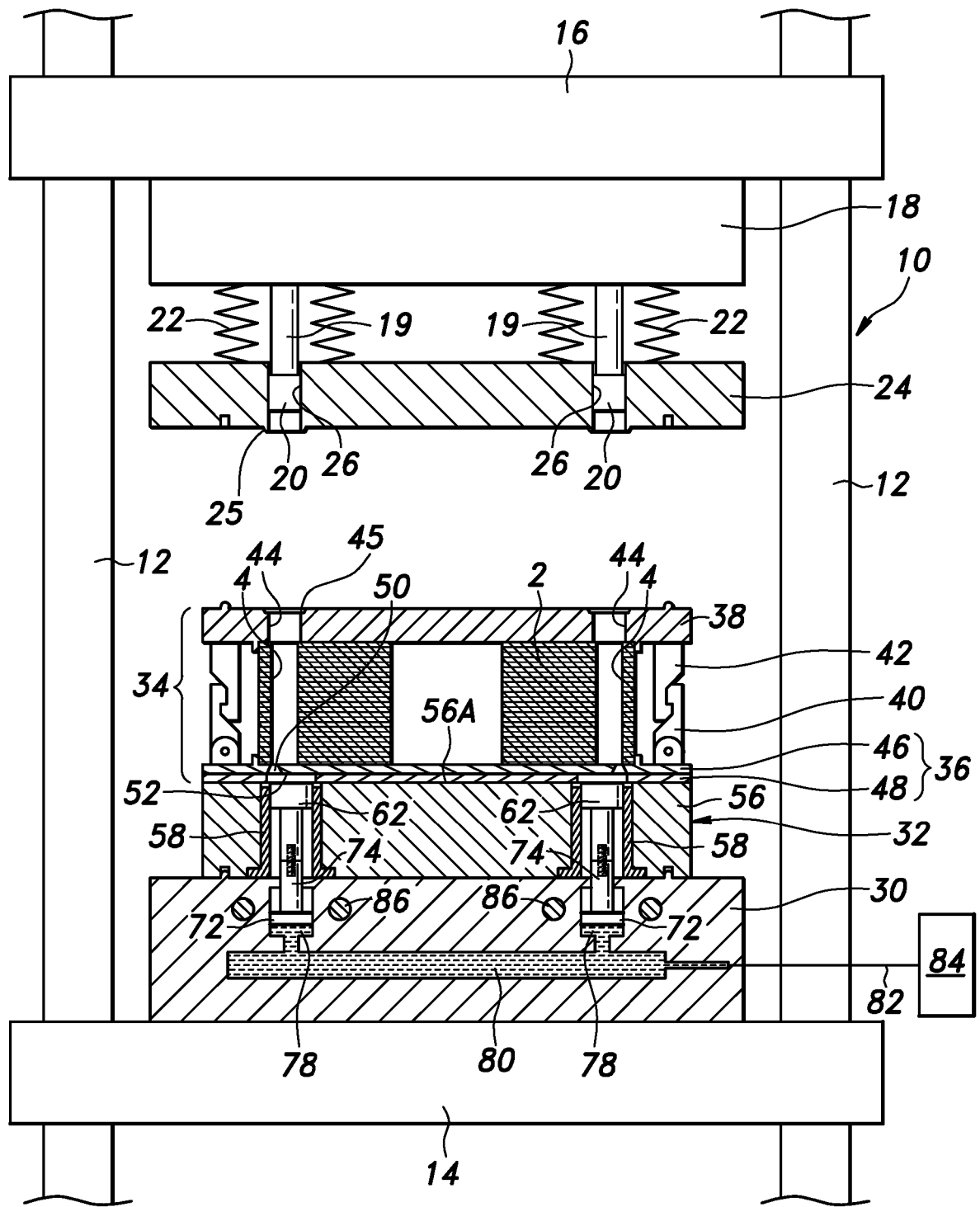
FIG. 3 is a vertical sectional view of the manufacturing device for the magnet embedded core according to the embodiment of the present invention in an initial state.

First of all, as shown in FIG. 3, with the movable platen 14 in the lowered state, the rotor core retainer 34 clamping the rotor core 2 between the separator plate 36 and the upper plate 38 is placed on the base 32, so that the magnet insertion holes 4 are aligned to and communicate with the respective gates 50. In this conjunction, the rotor core 2 along with the rotor core retainer 34 may be preheated.

In a following resin/magnet charging step, solid resin 7 is charged into the upper opening of each magnet insertion hole 4, and a magnet 5 is charged into the magnet insertion hole 4. The solid resin 7 may be prepared by forming uncured powder of material resin (before the chemical reaction is initiated by heating in the case of thermosetting resin) or granular material resin having relatively small diameters, and filler (which may include additives or the like) into a columnar or any other desired shape by using a pelleting machine (not shown in the drawings), or by forming uncured powder of material resin into granules of a relatively large size.

Figure 5:
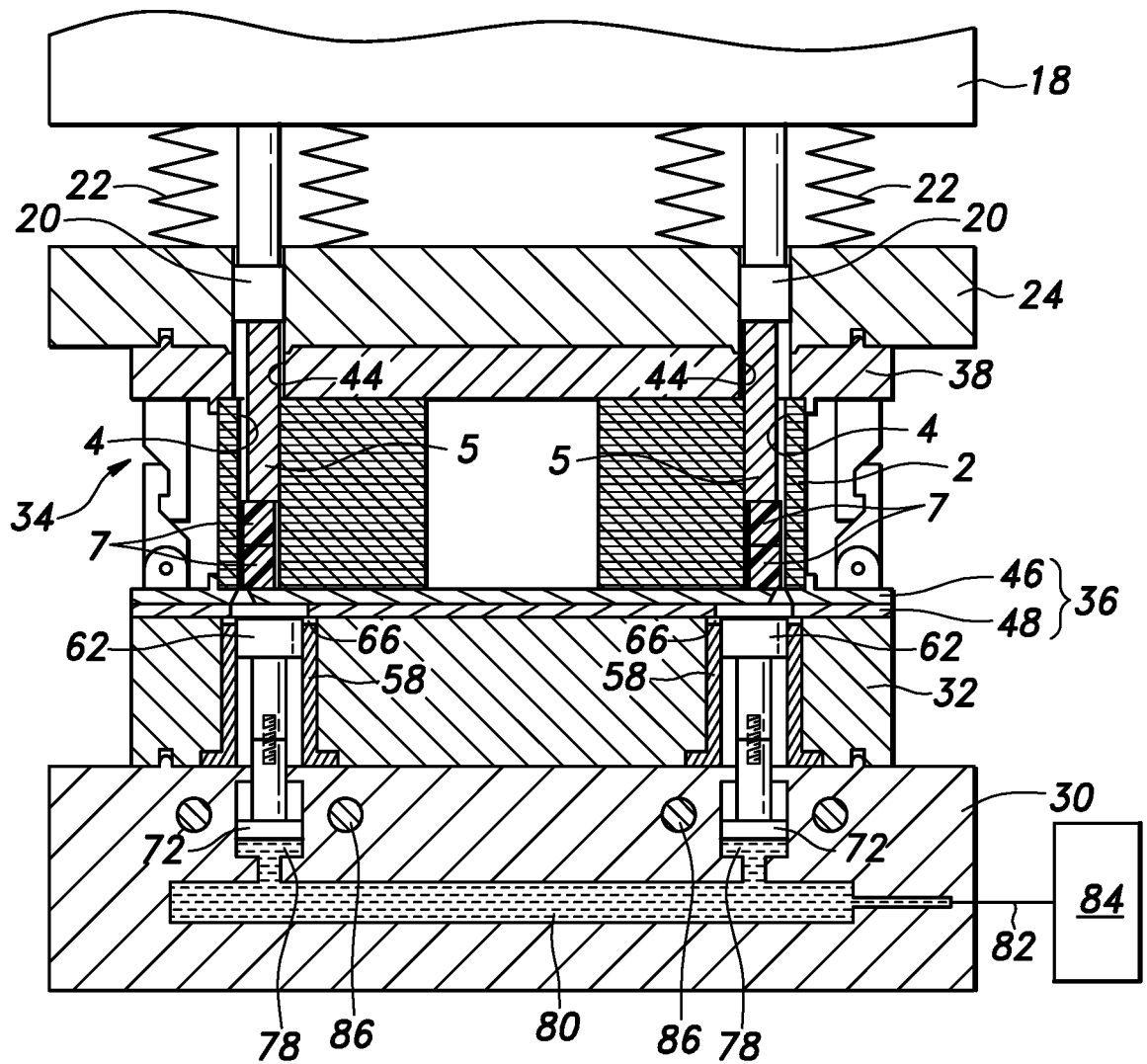
FIG. 5 is a vertical sectional view showing the manufacturing device for the magnet embedded core according to the embodiment of the present invention with solid resin and magnets inserted into magnet insertion holes.
Figure 6:
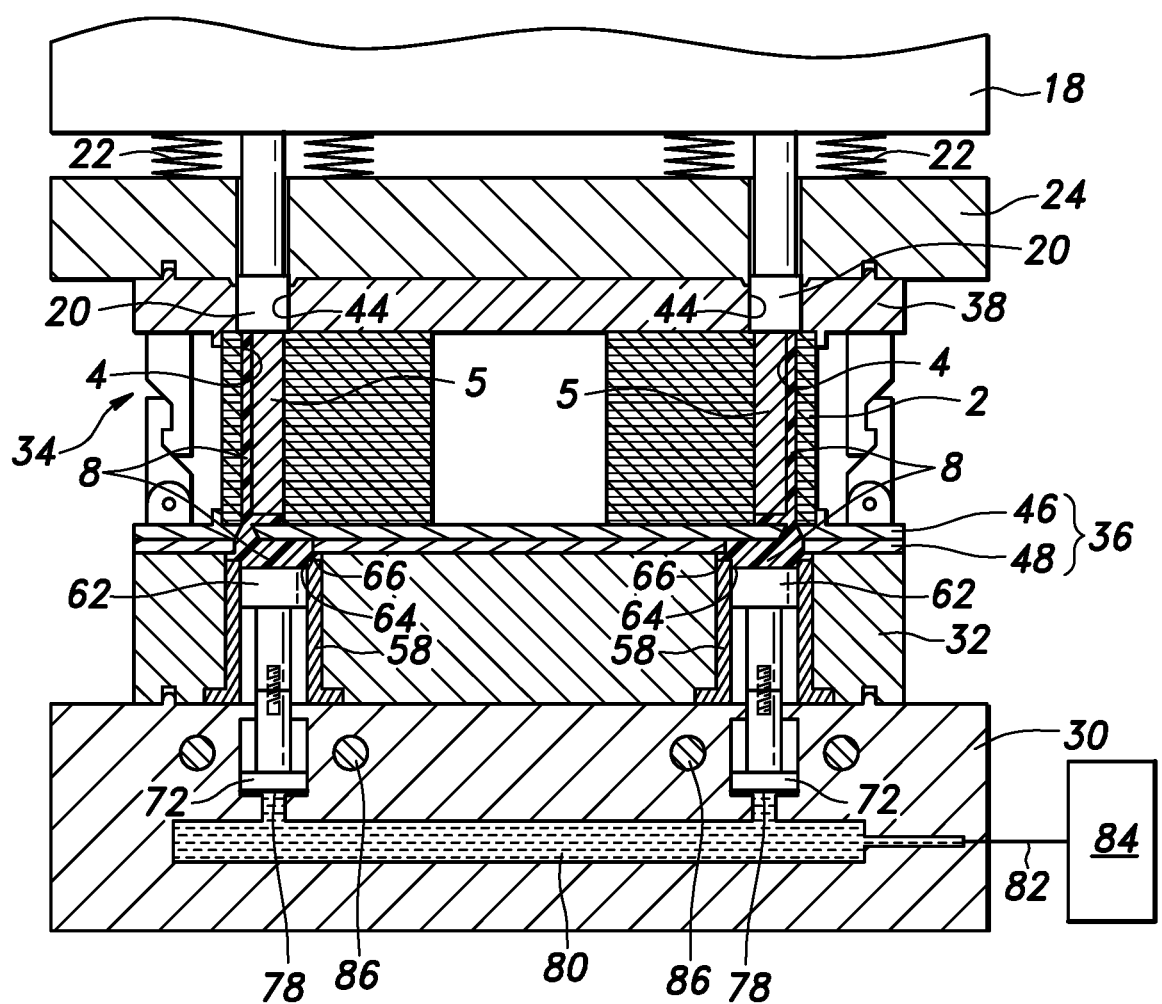
FIG. 6 is a vertical sectional view of the manufacturing device for the magnet embedded core according to the embodiment of the present invention with magnet insertion holes thereof closed.

Then, the movable platen 14 moves upward, causing the lower member 30 to move upward until the upper plate 38 abuts upon the core pressing member 24 as shown in FIG. 5. As the lower member 30 moves further upward, as shown in FIG. 6, each closure member 20 moves into the corresponding insertion hole 44 while the spring 22 is compressed so that the corresponding magnet 5 is pushed into the magnet insertion hole 4 by the closure member 20. The upper surface of the rotor core 2 then abuts upon the lower surface of the closure member 20 so that the upper opening of the magnet insertion hole 4 is closed by the closure member 20. This concludes a closing step.

At this time, the solid resin 7 in each magnet insertion hole 4 turns into molten resin 8 due to the heat of the preheated rotor core 2 and the heat supplied from the electric heater 86, and a part of the molten resin 8 flows into the corresponding resin pot chamber 64 and the corresponding recess 66 by passing through the gate 50 and the cull opening 52 and pushing down the plunger 62, the piston rod 74 and the piston 72.

Figure 7:
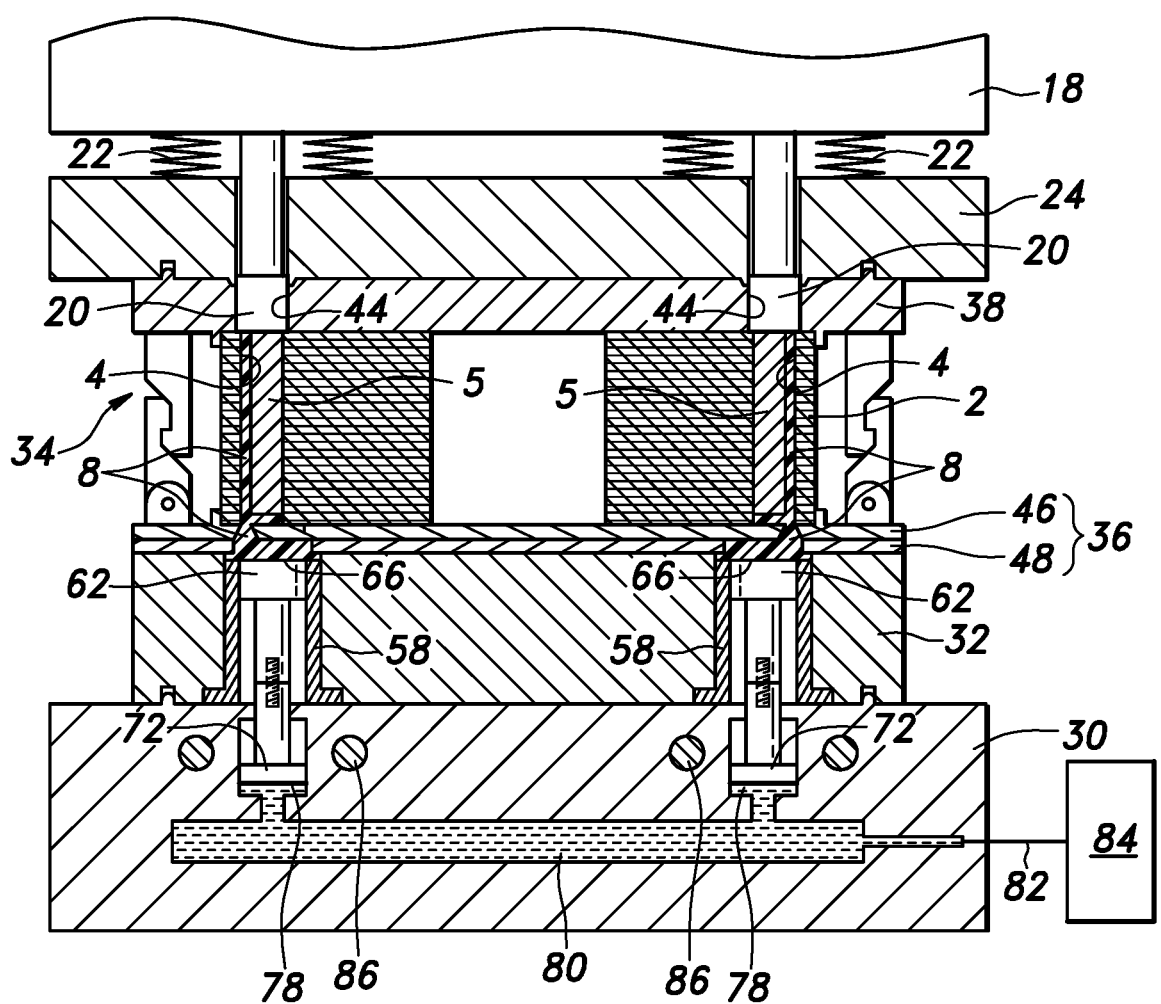
FIG. 7 is a vertical sectional view showing the manufacturing device for the magnet embedded core according to the embodiment of the present invention with the resin pressed into the magnet insertion holes and kept pressed therein.

Thereafter, as shown in FIG. 7, in a pressing feed process, hydraulic pressure is supplied from the hydraulic pressure generating device 84 to each cylinder chamber 78 so that the resulting upward movement of the pistons 72 causes the plungers 62 to press the molten resin 8 in the resin pot chambers 64 and feed the molten resin 8 into the magnet insertion holes 4 via the gates 50 and the cull openings 52.

In the pressing feed process, each recess 66 creates a stagnation region in which the fluidity of the molten resin 8 decreases so that a part of the molten resin 8 that has flowed into (advanced into) the recess 66 cures faster than a part of the molten resin 8 flowing through the gate 50 and the cull opening 52 on the way to the magnet insertion hole 4. Also, the volume of the part of the molten resin 8 in the recess 66 is substantially smaller than the volume of the part of the molten resin 8 in the cull opening 52 and other places, and the part of the molten resin 8 in the recess 66 has a relatively large surface area in contact with a wall surface of the recess 92 for the given volume. This also causes the part of the molten resin 8 in the recess 66 to cure at a relatively fast rate.

The part of the resin which has cured in each recess 66 provides a sealing action so that the molten resin 8 is prevented from entering the gap that may be present between the lower surface 48A of the cull plate 48, and the upper surface 56A of the base main body 56. This action is obtained also in the pressuring maintaining step for maintaining the pressure on the molten resin 8 that is performed following the pressing feed process.

Thereby, flash creation by the curing of the molten resin 8 in the gap between the lower surface 48A of the cull plate 48, and the upper surface 56A of the base main body 56 can be avoided so that problems such as surface flaws and resin leakage that could be caused by deposition of flash on the base 32 can be avoided. Also, mixing fragments of the flash with the molten resin, and causing any failure in properly filling the magnet insertion holes 4 with molten resin are prevented.

After elapsing of a prescribed pressurization time period, the supply of hydraulic pressure to the cylinder chambers 78 is terminated, and then the movable platen 14 is lowered so that a removal step of removing the rotor core retainer 34 from the base 32 may be performed. The removed rotor core retainer 34 is in the state as shown in FIG. 8 where solidified resin is deposited in the gates 50 and the cull openings 52, and the thick flash 9 which is connected to the part of the resin solidified in each cull opening 52 is attached to the part of the resin which has solidified in the corresponding recess 66, and been removed therefrom.

The thick flash 9 does not have a tendency to be readily broken as opposed to regular flash, and has a sufficient thickness to be kept connected to the part of the resin solidified in the corresponding cull opening 52. This thickness is determined by the thickness of the recess 66 as measured in the moving direction of the plunger 62, and may be about 0.1 mm to 0.3 mm. When the thickness of the thick flash 9 is less than 0.1 mm, the property of the thick flash 9 described above decreases, and when the thickness of the thick flash 9 is more than 0.3 mm, wastage of resin increases.

After completion of the curing of the molten resin 8, as a removal step, the connection between the separator plate 36 and the upper plate 38 by the movable engagement claws 40 and the fixed engagement claws 42 is released, and the rotor core 2 is removed from the rotor core retainer 34. During this removal step, the resin solidified in the gates 50 and the cull openings 52 along with the thick flash 9 are separated from the resin 6 of the magnet insertion holes 4 at the gates 50. Thereafter, the resin solidified in the gates 50 and the cull openings 52 along with the thick flash 9 are removed from the rotor core retainer 34 so that the rotor core retainer 34 may be used once again.

A manufacturing device for the magnet embedded core according to another embodiment of the present invention is described in the following with reference to FIG. 9. In FIG. 9, parts corresponding to those shown in FIG. 4 are denoted with like numerals, and description of such parts may be omitted in the following description.

In this embodiment, on the lower surface 48A of the cull plate 48 or the surface of the cull plate 48 facing the base 32, a part of the cull plate 48 surrounding each cull opening 52 is expanded radially outward to define a cutout 90, and a recess 92 is formed by this cutout 90 in cooperation with the pot member 58. The recess 92 is similar in function to the recess 66 of the previous embodiment, and extends radially outward of the resin pot chamber 64, and may be considered as forming a groove shape facing radially inward so as to surround the resin pot chamber 64 and directly communicate with the resin port chamber 64. The thickness of the recess 92 as measured in the moving direction of the plunger 62 may be 0.1 mm to 0.3 mm to achieve an effective sealing effect similarly as in the case of the previous embodiment although the thickness is again shown with some exaggeration in the drawings.

In this embodiment also, a part of the molten resin 8 that has flowed into (advanced into) the recess 92 and has ceased to flow cures faster than a part of the molten resin 8 flowing through the gate 50 and the cull opening 52 on the way to the magnet insertion hole 4. Also, the volume of the part of the molten resin 8 in the recess 92 is substantially smaller than the volume of the molten resin 8 in the cull opening 52 and other places so that the part of the molten resin 8 in the recess 92 has a relatively large surface area in contact with a wall surface of the recess 92 for the given volume. This also causes the part of the molten resin 8 in the recess 92 to cure at a relatively fast rate.

Thereby, flash creation by the curing of the molten resin 8 in the gap between the lower surface 48A of the cull plate 48, and the upper surface 56A of the base main body 56 can be avoided so that problems such as surface flaws and resin leakage that could be caused by deposition of flash on the base 32 can be avoided. Also, mixing fragments of the flash with the molten resin, and causing any failure in properly filling the magnet insertion holes 4 with the molten resin are prevented.

Although the present invention has been described in terms of preferred embodiments thereof, as can be appreciated easily by a person skilled in the art, the present invention is not limited by these embodiments, but can be modified in appropriate ways without departing from the purpose of the present invention.

For instance, the pot members 58 are not essential for the present invention, and each recess 66 may be formed by a cutout that extends an outer periphery of the resin pot chamber 64 of the base 32 (the base main body 56) in a radially outward direction. The recess 66 and 92 may be formed on both the upper surface of the base 32 and the lower surface of the separator plate 36.

The claims may appear to be directed only to the illustrated embodiment where the base 32 is placed on a lower side, but as it is only due to the limitation of the power of textual description, the present invention should be construed as being applicable to a reversed case where the base 32 is placed on an upper side.

The method and the device for manufacturing the magnet embedded core of the present invention are also applicable to transfer mold processes where solid resin 7 is charged into resin pot chamber 64 as disclosed in JP2017-7353A.

The constituent elements of the foregoing embodiment are not entirely essential for the present invention, but may be suitably omitted or substituted without departing from the purpose of the present invention.

Glossary of Terms 1 magnet embedded core
2 rotor core
2A lower end surface
3 shaft hole
4 magnet insertion hole
4A inner surface
4B opening
5 magnet
5A outer surface
6 resin
7 solid resin
8 molten resin
9 thick flash
10 manufacturing device
12 tie bar
14 movable platen
16 fixed platen
18 upper member
19 rod
20 closure member
22 spring
24 core pressing member
25 projection
26 through hole
30 lower member
32 base
34 rotor core retainer
36 separator plate
38 upper plate
40 movable engagement claw
42 fixed engagement claw
44 insertion hole
45 recess
46 gate plate
46A upper surface
48 cull plate
48A lower surface
50 gate
52 cull opening
54 pot retaining hole
54A inner circumferential surface
56 base main body
56A upper surface (outer surface)
58 pot member
58A upper end surface
60 flange
62 plunger
63 screw
64 resin pot chamber
66 recess
70 cylinder bore
72 piston
74 piston rod
76 through hole
78 cylinder chamber
80 manifold passage
82 external piping
84 hydraulic pressure generating device
86 electric heater
90 cutout
92 recess

The invention claimed is:

1. A device for manufacturing a magnet embedded core including a rotor core provided with a magnet insertion hole that constitutes a through hole opening out at both axial end surfaces of the rotor core, a magnet positioned in the magnet insertion hole, and resin with which the magnet insertion hole is filled, the manufacturing device comprising:
a base comprising one surface at which a resin pot chamber for storing molten resin opens;
a separator plate detachably placed on the one surface of the base, the rotor core being placed on the separator plate, the separator plate having a communication passage communicating the magnet insertion hole with the resin pot chamber; and
a plunger movably provided in the resin pot chamber to press the molten resin in the resin pot chamber into the magnet insertion hole via the communication passage;
wherein an annular recess is defined at a boundary between the base and the separator plate so as to extend outward of the resin pot chamber and communicate with the resin pot chamber,
the base includes a base main body having a pot retaining hole opening out at an outer surface of the base main body on a side of the one surface of the base, and a pot member fitted into the pot retaining hole,
the resin pot chamber is defined by the pot member,
the pot member has an end surface on a side of the one surface of the base, the end surface being offset from the outer surface of the base main body away from the separator plate, and
the recess is defined by the end surface of the pot member, an inner circumferential surface of the pot retaining hole and a surface of the separator plate on a side of the base.

2. The device for manufacturing the magnet embedded core according to claim 1, wherein a thickness of the recess in a moving direction of the plunger is from 0.1 mm to 0.3 mm.

3. A method for manufacturing the magnet embedded core including a rotor core provided with a magnet insertion hole that constitutes a through hole opening out at both axial end surfaces of the rotor core, a magnet positioned in the magnet insertion hole, and resin with which the magnet insertion hole is filled, by using the manufacturing device according to claim 1, the method comprising a pressing feed step of pressing the molten resin in the resin pot chamber into the magnet insertion hole with the plunger, wherein in the pressing feed step, a part of the molten resin that has advanced into the recess and ceased to flow in the recess is caused to solidify faster than a part of the molten resin flowing in a remaining part.

* * * * *